United States Patent [19]

Lederman

[11] Patent Number: 4,555,190
[45] Date of Patent: Nov. 26, 1985

[54] CLUTCH RELEASE BEARING ASSEMBLY

[75] Inventor: Frederick E. Lederman, Sandusky, Ohio

[73] Assignee: General Motors Corporation, Detroit, Mich.

[21] Appl. No.: 692,124

[22] Filed: Jan. 17, 1985

[51] Int. Cl.[4] .................. F16D 23/14; F16C 19/00; F16C 33/30
[52] U.S. Cl. .................. 384/495; 192/98; 192/110 B; 384/592; 384/609
[58] Field of Search .............. 384/477, 490, 495, 517, 384/519, 535, 537, 539, 590–592, 609, 611–617; 192/98, 110 B

[56] References Cited

U.S. PATENT DOCUMENTS

| | | | |
|---|---|---|---|
| 3,416,637 | 12/1968 | Maurice | 192/98 |
| 3,815,715 | 6/1974 | Maucher | 384/615 X |
| 4,029,186 | 6/1977 | de Gennes | 192/98 |
| 4,144,957 | 3/1979 | de Gennes | 192/98 |
| 4,403,685 | 9/1983 | Beccaris | 192/98 |
| 4,466,527 | 8/1984 | Billet | 192/110 B X |
| 4,467,904 | 8/1984 | Renaud | 192/110 B X |

FOREIGN PATENT DOCUMENTS

| | | | |
|---|---|---|---|
| 52-56250 | 5/1977 | Japan | 192/110 B |
| 147927 | 11/1981 | Japan | 192/110 B |
| WO80/01595 | 8/1980 | PCT Int'l Appl. | 192/110 B |
| 2058271 | 4/1981 | United Kingdom | 192/98 |
| 2073353 | 10/1981 | United Kingdom . | |

Primary Examiner—Donald Watkins
Assistant Examiner—Thomas R. Hannon
Attorney, Agent, or Firm—Patrick M. Griffin

[57] ABSTRACT

An improved self-centering bearing assembly for clutch release mechanism includes a radial bearing with a rotatable inner and non-rotatable outer race. The outer race is resiliently held for radial self-centering movement by an attachment member which mounts the bearing assembly to a plastic carrier of the clutch release mechanism. The resilient element that allows self-centering is compressed between a radial flange of the attachment and a face of the outer race. When removed from the carrier, the resilient element expands sufficiently to bias the radial flange into a radially extending portion of a declutching finger contacting member rigid to the inner race. This retains the attachment member to the bearing as a separately handled, rattle-free unit. The spacing between that portion of the contact member and the face of the outer race against which the resilient element bears is small enough not only to allow unitization, but also small enough that when the resilient element of the mounted bearing assembly is compressed, the resulting gap between that portion of the contact member and the radial flange is just sufficient to allow relative rotation of the races, so that the bearing is shielded. Therefore, the extension of the contact member has both a retention and a shielding function in cooperation with structure already present for other purposes.

3 Claims, 3 Drawing Figures

CLUTCH RELEASE BEARING ASSEMBLY

This application relates to clutch release bearing assemblies and specifically to an improved self-centering clutch release bearing assembly.

BACKGROUND OF THE INVENTION

Clutch release mechanisms in manual transmission vehicles generally include a carrier that is moved axially toward and away from a plurality of declutching fingers of a diaphragm-type clutch. A control means, such as a fork or hydraulic cylinder, moves the carrier. A bearing device is necessary between the carrier and the declutching fingers to mate the axial motion of the carrier to the rotary motion of the declutching fingers.

While a conventional thrust bearing has been used in the past in such a clutch release mechanism, the trend today is toward the use of a radial bearing having inner and outer races with a complement of bearing balls therebetween. It is also desirable that a means for allowing the bearing to self-center relative to the clutch be provided, since the carrier itself may not always be coaxial with the clutch. One conventional and simple self-centering means may be seen in the U.S. patent to Maurice, U.S. Pat. No. 3,416,637. A resilient element, such as a Belleville washer, is compressed against a face of one of the races of the bearing to bias the other face of the race into a radial wall of the carrier and hold the race non-rotatably, but radially slidable, relative to the carrier. The other race of the bearing is free to rotate and has a contact member that is engageable with the declutching fingers as the carrier moves. The radial sliding provided by the compressed resilient element allows the bearing to move to a centered position relative to the clutch. One means of compressing the resilient element is an attachment member that is detachably joinable to the carrier so as to axially compress the resilient element between the bearing face and a radial flange of the attachment member. This also mounts the bearing to the carrier.

An example of a clutch release bearing assembly of the type referred to above may be seen in the UK patent application No. GB 2073353A. There, the clutch release bearing assembly includes a radial bearing in which the outer race is held to the carrier by an attachment member that snap fits with the carrier to axially compress a resilient washer between a radial flange of the attachment member and a face of the outer race. The inner race is engageable with the declutching fingers. However, the attachment member is separate from the bearing and must be separately handled when the bearing is mounted to the carrier. A similar design is found in the U.S. patent to Beccaris, U.S. Pat. No. 4,403,685. Not only is the attachment member a separately handled piece, but an additional cover member is necessary to fill the gap between the inner and outer races to shield the rolling elements of the bearing.

SUMMARY OF THE INVENTION

The subject invention provides an improved self-centering bearing assembly for a clutch release mechanism in which a retention and shielding portion of the contact member cooperates with the resilient element to retain the attachment member to the bearing as a substantially rattle-free unit when the housing is detached from the carrier. The retention and shielding portion also cooperates with the attachment member to shield the bearing when the bearing is mounted to the carrier.

The bearing assembly includes several conventional elements, including a plastic carrier with an axial sleeve, a radial wall nearly perpendicular thereto, and a cylindrical wall extending from the radial wall coaxially to the axial sleeve to form an annular space therewith. The carrier is moved axially toward and away from a set of declutching fingers by a conventional control mechanism, such as a fork or hydraulic cylinder. A radial bearing with inner and outer races fits with radial clearance within the annular space referred to above.

The bearing assembly includes structure designed to allow self-centering of the bearing and to mount the bearing to the carrier. An attachment member has a cylindrical wall that surrounds the bearing and fits closely within the carrier cylindrical wall. A radial flange extends from the attachment member cylindrical wall radially inwardly past an axially outer face of the outer race of the bearing. Snap fingers on the cylindrical wall of the attachment member engage windows in the carrier cylindrical wall, thereby mounting the bearing to the carrier and compressing a suitable resilient element between the attachment member radial flange and the axially outer face of the outer race. The compressed resilient element axially biases the opposite face of the outer race into the radial wall of the carrier. The bias of the resilient element retains the outer race non-rotationally, but radially slidably, relative to the carrier radial wall. The rotational inner race of the bearing includes a contact member that is engageable with the declutching fingers of the clutch as the carrier member is moved axially theretoward. The radially slidable retention of the outer race allows the bearing to self-center relative to the clutch as the contact member engages the declutching fingers.

The bearing assembly of the invention also includes additional structure that cooperates with the structure described above to give the added benefits of unitization of the assembly and shielding of the bearing. The contact member includes a retention and shielding portion of annular shape extending radially outwardly past the radial flange of the attachment member. The retention and shielding portion is axially spaced from the radial face of the outer race of the bearing a distance sufficiently small that, when the attachment member is detached from the carrier, the resilient element may axially expand sufficiently to bias the radial flange of the attachment member axially into the retention and shielding portion. This biasing serves to retain the attachment member to the bearing as a substantially rattle-free unit which may be separately handled apart from the carrier. Additionally, when the attachment member is joined to the carrier by engaging the snap fingers and windows to compress the resilient element, the radial flange of the housing member moves axially away from the retention and shielding portion of the contact a slight distance. This slight distance is just sufficient to allow the inner and outer races to rotate relative to each other when the contact member engages the declutching fingers, thereby serving to substantially exclude contaminants. Therefore, the retention and shielding member also cooperates with the radial flange of the attachment member to shield and protect the bearing.

It is, therefore, an object of the invention to provide an improved self-centering bearing assembly for a clutch release mechanism in which a resilient element compressed between a radial flange of a detachably joinable attachment member and a face of one race of a bearing to allow self-centering of the bearing relative to the clutch also cooperates with a portion of a contact member on the other race by axially expanding to bias the radial flange of the attachment member into the portion of the contact member to maintain the attachment member and bearing together as a substantially rattle-free, separately handled unit.

It is yet another object of the invention to provide such a clutch release bearing assembly in which, when the attachment member is joined to a carrier of the clutch release mechanism, the resilient element will be compressed and the radial flange will move axially away from the contact member portion just sufficiently to allow the bearing races to rotate relatively, whereby the contact member portion may also cooperate with the radial flange to shield the bearing.

It is a further object of the invention to provide a clutch release bearing assembly of the type described incorporating a conrad-type radial bearing, in which the contact member is rigidly joined to a rotatable race of the bearing to thereby positively axially locate and space the retention and shielding portion of the contact member relative to a face of the other, non-rotatable race of the bearing.

DESCRIPTION OF THE PREFERRED EMBODIMENT

These objects and other features of the invention will appear from the following written description and drawings in which.

Figure 1:
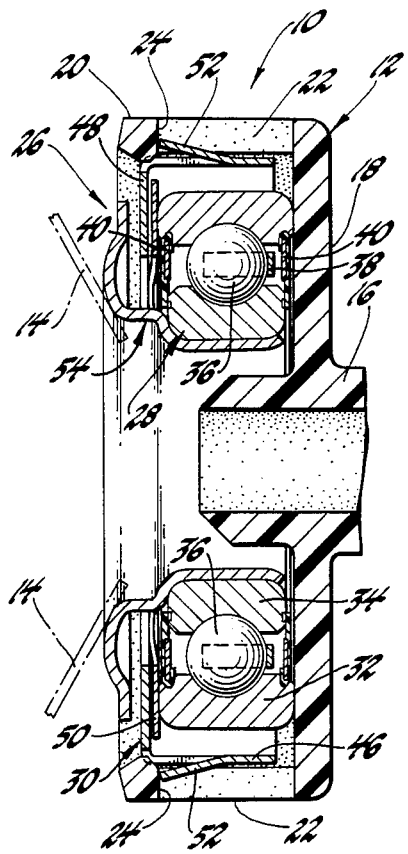
FIG. 1 is a cross section of the bearing assembly of the invention joined to the carrier of the clutch release mechanism.

Referring first to FIG. 1, a clutch release mechanism designated generally at 10 includes a carrier 12 that is moved axially toward and away from a set of declutching elements or fingers 14, shown in dotted lines, of a diaphragm-type clutch, not shown. Carrier 12 could be moved by any conventional control means, such as a fork or a hydraulic cylinder. Carrier 12, molded of plastic or similar material, includes an axial sleeve 16, a radial wall 18 generally perpendicular thereto, and a cylindrical wall 20 extending from radial wall 18 coaxially to, and forming an annular space with, axial sleeve 16. While a typical carrier 12 need not necessarily include a cylindrical wall 20, it will generally include the axial sleeve 16 and radial wall 18, or very similar structure. Cylindrical wall 20 includes a circumferentially evenly spaced series of four rectangular windows or slots 22, each with a forward edge 24. As carrier 12 is moved, axial sleeve 16 would be guided on a pilot shaft, not shown, which would be rigid to the transmission case.

Since declutching fingers 14 are spinning when the clutch is to be disengaged, some type of bearing assembly, designated generally at 26, is necessary to directly engage the declutching fingers 14 to transmit the axial thrust of carrier 12 thereto.

Figure 3:
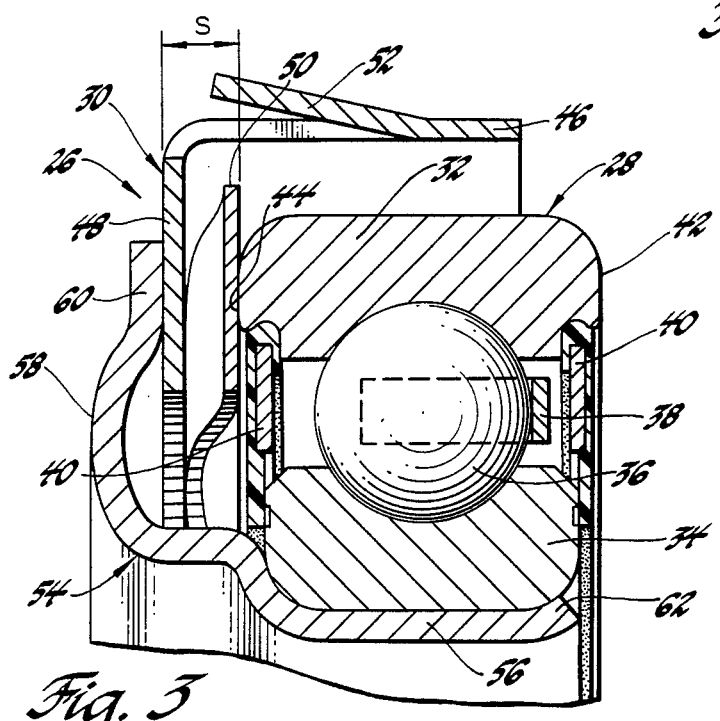
FIG. 3 is a view showing the same portion of the bearing assembly as FIG. 2, but detached from the carrier of the clutch release mechanism.

Referring next to FIG. 3, bearing assembly 26 includes a radial bearing, designated generally at 28, mounted to carrier 12 in a manner described below by an attachment member, designated generally at 30.

Bearing 28 includes an outer race, designated generally at 32, an axially narrower inner race 34, and a complement of bearing balls 36 that are conrad assembled between races 32 and 34 and separated by a standard snap-in cage 38. Races 32 and 34 are already axially located relative to each other by virtue of the conrad assembly, which is used to advantage in the embodiment of bearing assembly 26 disclosed. A pair of conventional snap shields 40 complete bearing 28. The wider outer race 32 has axially inner and outer faces 42 and 44, for a purpose described below.

Still referring to FIG. 3, attachment member 30, stamped from sheet steel, is generally L-shaped in cross section, with a cylindrical wall 46 and an integral radial flange 48. Cylindrical wall 46 surrounds bearing 28 and has a diameter generally equal to the inside diameter of cylindrical wall 20 of carrier 12. Radial flange 48 extends radially inwardly past outer face 44. A resilient element provided by a wavy washer 50, which serves two purposes described further below, is biased between radial flanges 48 and outer face 44. Cylindrical wall 46 further includes four radially resilient snap fingers 52 which operate to detachably join it to carrier 12 in a manner described below.

A housing member, designated generally at 54, completes bearing assembly 26. Housing member 54, also stamped of sheet steel, is axially rigid to inner race 34. Housing member 54 includes a cylindrical bearing seat 56 and a curved contact member 58 that extends radially outwardly and axially inwardly therefrom. Bearing seat 56 is sized to snugly engage the outside of inner race 34. A retention and shielding portion 60, integrally stamped with contact member 58, has an annular shape and extends radially outwardly past the radial flange 48, and cooperates therewith as next described.

To assemble bearing assembly 26, attachment member 30 is positioned with wavy washer 50 held between radial flange 48 and axially outer face 44. Inner race 34 is then friction fitted onto bearing seat 56 and pushed toward contact member 58 as far as it will go. Next, the terminal edge of bearing seat 56 is swaged over at 62 to retain inner race 34, and thus bearing 28, to housing member 54. This serves to positively axially locate and space retention and shielding portion 60 from axially outer face 44, because races 32 and 34 are already axially located relative to each other as described above. In effect, housing member 54 builds upon or extends that relative axial location. The axial spacing, denoted S in FIG. 3, is made sufficiently small that wavy washer 50 will axially expand to bias radial flange 48 into retention and shielding portion 60. This resilient bias acts to retain attachment member 30 to bearing 28 as a substantially rattle-free, separately handled unit apart from the carrier 12. Thus, wavy washer 50, which is designed to serve another function described below, also cooperates with retention and shielding portion 60 to unitize bearing assembly 26.

Variations of the structure described may be imagined within the spirit of the invention. For example, wavy washer 50 could be eliminated as a separate part by stamping a wavy washer integrally with radial flange 48. In addition, housing member 54 could be eliminated as a separate piece by integrating it with inner race 34. A different bearing, such as an angular contact bearing with stamped races, would make the integration of housing member 54 with inner race 34 simple. However, additional structure, such as an inner axial sleeve, would be needed to give the complete positive axial location of the bearing races already present in the case of a conrad assembled bearing.

Figure 2:
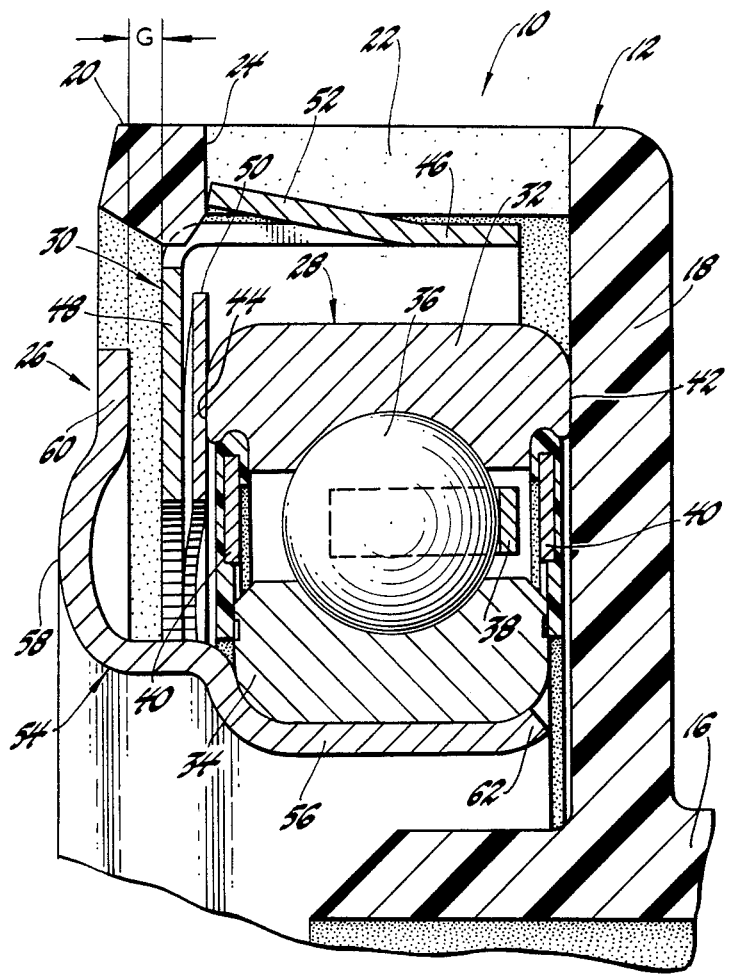
FIG. 2 is an enlarged section of FIG. 1.

Referring next to FIG. 2, attachment member 30 is detachably joined to carrier 12 by pushing bearing assembly 26 axially into the annular space between carrier cylindrical wall 20 and axial sleeve 16. The attachment member cylindrical wall 46 acts as an alignment surface as bearing assembly 26 slides into place and snap fingers 52 are biased radially inwardly by the inside of cylindrical wall 20. When the axially inner face 42 of the wider outer race 32 engages the inside of radial wall 18, the snap fingers 52 will snap into slots 22, the ends thereof engaging the front edges 24 of slots 22. This mounts bearing 28 to carrier 12 and compresses wavy washer 50 sufficiently to hold outer race 32 so that it will not rotate relative to the carrier 12, but will still be radially slidable relative to axial sleeve 16. The narrower inner race 34 can, of course, freely rotate relative to the carrier 12. While bearing 28 will not necessarily be coaxial with the clutch after it is mounted, it may self-center, when contact member 58 engages declutching fingers 14, by virtue of the radial sliding action allowed by wavy washer 50.

The amount of axial compression of wavy washer 50 necessary is determined by the resiliency of wavy washer 50 and how much holding force is needed for outer race 32. However, the axial spacing S is also sufficiently small so that the axial compression of wavy washer 50 that occurs will move radial flange 48 axially away from retention and shielding portion 60 to leave a gap G just sufficient to allow inner race 34 to rotate relative to outer race 32. Thus, retention and shielding portion 60 can also cooperate with radial flange 48 to shield bearing 28 from the entrance of contaminants because of the relatively small gap therebetween. There is no need for a separate cover member to fill or shield the space between the races 32 and 34, that function being served by structure that serves other purposes as well. The shielding function is enhanced if retention and shielding portion 60 is structurally part of a rotatable inner race 34 as shown, because the spinning action serves to centrifugally throw contaminants outwardly and away.

Therefore, it will be seen that a bearing assembly is both unitized and shielded by a minimum of structural parts that cooperate with each other to serve more than one function. It is to be understood that the invention may be embodied in structures other than those herein disclosed, and is not to be so limited.

The embodiments of the invention in which an exclusive property or privilege is claimed are defined as follows:

1. An improved self-centering bearing assembly for a clutch release mechanism or the like of the type in which a carrier axially movable toward and away from a set of declutching elements has a radial bearing mounted thereto by an attachment member detachably joinable to said carrier with a resilient element axially compressed between a radial flange of said attachment member and a face of a race of said bearing that is non-rotatable relative to said carrier, with a rotatable race of said bearing having a contact member engageable with said declutching elements as said carrier moves axially theretoward, said improvement comprising:

a retention and shielding portion extending from said contact member radially past said attachment member radial flange and axially spaced from said face of said non-rotatable race by a distance sufficiently small that, when said attachment member is detached from said carrier, said resilient element may cooperate with said retention and shielding portion by axially expanding to bias said attachment member radial flange into said retention and shielding portion to retain said attachment member to said bearing as a substantially rattle-free unit and so that, when said attachment member is joined to said carrier to compress said resilient element, said attachment member radial flange will move axially away from said retention and shielding portion just sufficiently to allow the bearing races to relatively rotate, whereby said attachment member radial flange and said retention and shielding portion may cooperate to shield said bearing.

2. An improved self-centering bearing assembly for a clutch release mechanism or the like of the type in which a carrier axially movable toward and away from a set of declutching elements has a radial bearing mounted thereto by an attachment member detachably joinable to said carrier with a resilient element axially compressed between a radial flange of said attachment member and a face of an outer race of said bearing which is non-rotatable relative to said carrier, with an inner, rotatable, race of said bearing having a contact member engageable with said declutching elements as said carrier moves axially theretoward, said improvement comprising:

a retention and shielding portion extending from said contact member radially outwardly past said member radial flange and axially spaced from said outer race face by a distance sufficiently small that, when said attachment member is detached from said carrier, said resilient element may cooperate with said retention and shielding portion by axially expanding to bias said attachment member radial flange into said retention and shielding portion to retain said attachment member to said bearing as a substantially rattle-free unit and so that, when said attachment member is joined to said carrier to compress said resilient element, said attachment member radial flange will move axially away from said retention and shielding portion just sufficiently to allow said inner race to rotate relative to said outer race, whereby said attachment member radial flange and said retention and shielding portion may cooperate to shield said bearing.

3. An improved self-centering bearing assembly for a clutch release mechanism or the like of the type in which a carrier axially movable toward and away from a set of declutching elements has a conrad-type radial bearing mounted thereto by an attachment member detachably joinable to said carrier with a resilient element axially compressed between a radial flange of said attachment member and a face of an outer race of said bearing which is non-rotatable relative to said carrier, with an inner, rotatable, race of said bearing adapted to be engageable with said declutching elements as said carrier moves axially theretoward, said improvement comprising:

a contact member rigidly joined to the inner race of said conrad-type bearing to engage said declutching fingers, said contact member having an annular shielding and retention portion extending radially outwardly past said outer race face and being positively axially located and spaced relative thereto by virtue of being rigid to said inner race, said axial spacing being sufficiently small that, when said attachment member is detached from said carrier, said resilient element may cooperate with said retention and shielding portion by axially expanding to bias said attachment member radial flange into said retention and shielding portion to retain said attachment member to said bearing as a substantially rattle-free unit and so that, when said attachment member is joined to said carrier to compress said resilient element, said attachment member radial flange will move axially away from said retention and shielding portion just sufficiently to allow said inner race to rotate relative to said outer race, whereby said attachment member radial flange and said retention and shielding portion may cooperate to shield said bearing.

* * * * *